(12) United States Patent
McGee (10) Patent No.: US 7,787,526 B2
(45) Date of Patent: Aug. 31, 2010

(54) CIRCUITS AND METHODS FOR A MULTI-DIFFERENTIAL EMBEDDED-CLOCK CHANNEL

(76) Inventor: James Ridenour McGee, 9040 Lake Jane Trl N, Lake Elmo, MN (US) 55042

( * ) Notice: Subject to any disclaimer, the term of this patent is extended or adjusted under 35 U.S.C. 154(b) by 976 days.

(21) Appl. No.: 11/179,932

(22) Filed: Jul. 12, 2005

(65) Prior Publication Data

US 2007/0014340 A1    Jan. 18, 2007

(51) Int. Cl.
*H04B 1/38* (2006.01)
(52) U.S. Cl. .................... 375/219; 327/52; 327/89; 327/96; 327/127; 327/246; 327/266; 327/274; 330/252; 348/710; 375/318; 388/910
(58) Field of Classification Search .......... 326/56; 327/307; 330/254; 375/219, 286, 288, 376
See application file for complete search history.

(56) References Cited

U.S. PATENT DOCUMENTS

| | | | |
|---|---|---|---|
| 3,611,141 A | 10/1971 | Waters | 341/57 |
| 3,666,890 A | 5/1972 | Wade | 370/206 |
| 4,084,069 A * | 4/1978 | Looschen | 375/288 |
| 4,373,152 A | 2/1983 | Jacobsthal | 341/56 |
| 4,449,119 A | 5/1984 | Hanna et al. | 341/70 |
| 4,486,739 A | 12/1984 | Franaszek et al. | 341/59 |
| 4,688,016 A | 8/1987 | Fok | 341/59 |
| 4,910,750 A | 3/1990 | Fisher | 341/57 |
| 4,929,946 A | 5/1990 | O'Brine et al. | 341/87 |
| 5,166,956 A * | 11/1992 | Baltus et al. | 375/286 |
| 5,191,330 A | 3/1993 | Fisher et al. | 341/56 |
| 5,525,983 A | 6/1996 | Patel et al. | 341/57 |
| 5,862,180 A | 1/1999 | Heinz | 375/244 |
| 5,880,599 A * | 3/1999 | Bruno | 326/56 |
| 6,088,415 A * | 7/2000 | Gaudet | 375/376 |
| 6,107,856 A * | 8/2000 | Bitting | 327/307 |
| 6,114,979 A | 9/2000 | Kim | 341/57 |
| 6,240,523 B1 | 5/2001 | Rogers | 713/400 |

(Continued)

FOREIGN PATENT DOCUMENTS

EP    0458390 A2    11/1991

(Continued)

OTHER PUBLICATIONS

Aghdasi, Farhad "Systematic Design of Self-Clocked Circuits for VLSI Applications" New Directions in VLSI Design, Nov. 27, 1989 pp. 1-16.

(Continued)

*Primary Examiner*—David C Payne
*Assistant Examiner*—Adolf Dsouza (57) ABSTRACT

An interface circuit for a multi-differential embedded-clock channel for communicating data provides efficient utilization of the bandwidth of the channel. The interface circuit includes at least four first signals, at least four second signals, and a multi-differential amplifier. The multi-differential amplifier is coupled to the first and second signals. The multi-differential amplifier is adapted to generate the second signals by amplifying, for all combinations of two of the first signals, differential transitions between the two of the first signals. Each of a plurality of symbols of the data has a corresponding one of the differential transitions, and the differential transitions are serially communicated through the channel.

29 Claims, 5 Drawing Sheets

U.S. PATENT DOCUMENTS

| | | |
|---|---|---|
| 6,339,622 B1 | 1/2002 | Kim |
| 6,763,477 B1 | 7/2004 | McGee ..................... 713/600 |
| 7,403,069 B2 | 7/2008 | D'Aquino |
| 2005/0089106 A1 | 4/2005 | Cho et al. |
| 2006/0145762 A1* | 7/2006 | Leete ..................... 330/254 |

FOREIGN PATENT DOCUMENTS

| | | |
|---|---|---|
| JP | 358060857 A | 4/1983 |
| JP | 360043263 A | 3/1985 |
| JP | 360203023 A | 10/1985 |
| WO | WO-03/040862 A2 | 5/2003 |

OTHER PUBLICATIONS

Roine, Per T. "An Asynchronous PRBS Error Checker for Testing High-Speed Self-clocked Serial Links" IEEE 1998 pp. 133-141.

U.S. Appl. No. 09/628,564, filed Jul. 31, 2000, McGee, James.

U.S. Appl. No. 09/629,806, filed Jul. 31, 2000, McGee, James.

* cited by examiner

CIRCUITS AND METHODS FOR A MULTI-DIFFERENTIAL EMBEDDED-CLOCK CHANNEL

FIELD OF THE INVENTION

The present invention generally relates to data communication channels.

BACKGROUND

Data can be communicated between computers and within computers using various protocols for communicating the data. Data can be synchronously communicated using a global clock that is provided to both the sources and the destinations of the data. Each destination can sample the current value from a bus connecting the sources and the destinations at transitions of the global clock and each source can transmit the next value to the bus at these transitions of the global clock. Because the next value driven to the bus takes some time to propagate from the sources to the destination, the period of the global clock can be limited by the propagation times between the sources and the destinations. This limitation on the clock period can limit the bandwidth of data transfer by the bus.

Data may also be synchronously communicated using a source-synchronous clock. A source of data may transmit the next value of the data to a bus connecting the source to one or more destinations. The next value of the data to be communicated may be transmitted by the source to the bus at transitions of a clock, and a version of the clock may also be transmitted to the bus along with the data. Each destination may sample the current value from the bus at transitions of the version of the clock received from the bus. Because the data and the clock propagate together from the source to each destination, the length of the propagation time between the source and the destinations can be eliminated as a limiter of the bandwidth of data transfer by the bus. However, the differences in propagation times, or skew, between the source-synchronous clock and each data bit of the bus can limit the bandwidth of data transfer by the bus. The skew can be reduced by transmitting multiple copies of the source-synchronous clock for various subsets of the data bits of the bus; however, each source-synchronous clock adds overhead that reduces the effective bandwidth per signal of the bus.

Higher bandwidth data communication than provided by global clocking and source-synchronous clocking can be achieved by transferring the clock encoded in the data transferred. Typically, encoded clock communication uses a point-to-point communication channel, with one source and one destination. The clock and data can be encoded using an 8b/10b encoding. The 8b/10b encoding encodes each 8 bits of data in a 10 bit symbol and the bits of the symbols can be serially communicated through the channel using differential signaling. The destination may use a phase-locked loop to recover the transmit clock from the frequent transitions of the encoded symbols. Because the clock is encoded in the data, skew between the clock and the data can be eliminated as a limiter of the bandwidth of data transfer by the channel. However, the jitter of the transmit clock and the recovered clock may misalign the sampling of the data at the destination and thereby limit the bandwidth of data transfer by the channel. In addition, the effective bandwidth is reduced by the twenty percent overhead of the 8b/10b encoding.

Specialized analog circuits are required to encode, transmit, receive, and decode encoded clock data communications. For example, phase-locked loops are specialized analog circuits that are expensive and time-consuming to design, occupy a significant amount of area on an integrated circuit, and dissipate a significant amount of power during operation. The scaling of generations of integrated circuit fabrication processes is making the design of these specialized analog circuits more expensive and more time-consuming. For example, the scaling of fabrication processes is reducing the power supply voltage, and current fabrication processes already implement special transistors supporting a higher power supply voltage for analog circuits. Even with these special transistors supporting a higher power supply voltage, the design of analog circuits is becoming more difficult and time-consuming with each process generation.

The present invention may address one or more of the above issues.

SUMMARY OF THE INVENTION

Various embodiments of the invention provide an interface circuit for a multi-differential embedded-clock channel for communicating data. The interface circuit includes at least four first signals, at least four second signals, and a multi-differential amplifier. The multi-differential amplifier is coupled to the first and second signals. The multi-differential amplifier is adapted to generate the second signals by amplifying, for all combinations of two of the first signals, differential transitions between the two of the first signals. Each of a plurality of symbols of the data has a corresponding one of the differential transitions, and the differential transitions are serially communicated through the channel.

Various other embodiments of the invention provide a method for communicating data using a multi-differential embedded-clock channel. A plurality of differential transitions are amplified using a first multi-differential amplifier. The differential transitions are serially transmitted from the first multi-differential amplifier to the channel. The differential transitions are between all combinations of two of at least four signals of the channel. The differential transitions are serially received from the channel to a second multi-differential amplifier. The differential transitions received from the channel are amplified using the second multi-differential amplifier.

It will be appreciated that various other embodiments are set forth in the Detailed Description.

BRIEF DESCRIPTION OF THE DRAWINGS

Various aspects and advantages of the invention will become apparent upon review of the following detailed description and upon reference to the drawings in which.

DETAILED DESCRIPTION

Various embodiments of the invention use multi-differential signaling to communicate data from a transmitter to a receiver through a channel that has at least four signals. For each symbol of the data, the signals of the channel have a corresponding differential transition. Because each of the differential transitions communicating the data can be a differential transition between any two signals of the channel, the signaling is denoted multi-differential signaling. The differential transitions are serially communicated through the channel, such that the differential transitions nominally occur one at a time. Further, there is a differential transition for every symbol, such that a clock is embedded in the differential transitions. In contrast with an existing encoded-clock signaling using the 8b/10b encoding, various embodiments of the invention provide embedded-clock signaling for which the clock can be recovered without using a phase-locked-loop.

For further discussion of multi-differential embedded-clock signaling, reference may be made to U.S. Pat. No. 6,763,477, titled "Method and Apparatus for Transmitting and Receiving Data using a Self Clocking Link Protocol," having the same inventive entity, James Ridenour McGee, as the present invention and herein incorporated by reference. Reference may also be made to abandoned U.S. patent application Ser. No. 09/629,806, titled "A Self-Clocking Link Protocol" and Ser. No. 09/628,564, titled "A Method and Apparatus for Transmitting Data using a Self-Clocking Link Protocol," which have the same inventive entity, James Ridenour McGee, as the present invention and are incorporated by reference in U.S. Pat. No. 6,763,477 above.

The transmitter and the receiver can each interface with the channel using a multi-differential amplifier. A multi-differential amplifier amplifies receives differential transitions between any two input signals, and delivers an amplification of the differential transitions to the outputs signals. The transmitter can also include an encoder to encode the data into the differential transitions and the receiver can also include a clock and data recovery circuit to recover the clock and the data from the amplification of the differential transitions.

Figure 1:
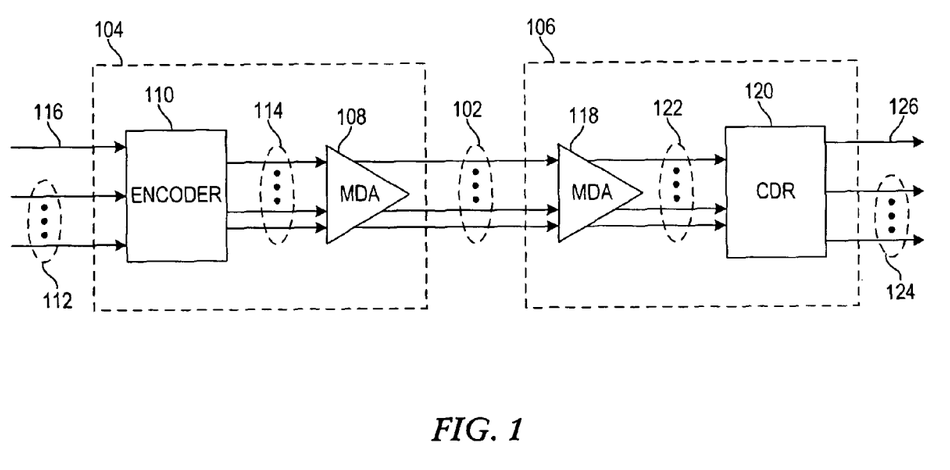
FIG. 1 is a block diagram of a system for communicating data using a multi-differential embedded-clock channel in accordance with various embodiments of the invention.

FIG. 1 is a block diagram of a system for communicating data using a multi-differential embedded-clock channel 102 in accordance with various embodiments of the invention. Data is transmitted through the channel on lines 102 from a transmitter 104 to a receiver 106. In one embodiment the channel on lines 102 includes four signals and in another embodiment the channel includes six signals. Generally, the channel on lines 102 includes at least four signals. It will be appreciated that the channel on lines 102 can include an odd number of signals.

The transmitter 104 can include a multi-differential amplifier 108 and an encoder 110. The encoder 110 can encode data symbols received by transmitter 104 on the signals of lines 112 into differential transitions on lines 114. Typically for a channel on lines 102 including an even number of signals, between differential transitions half of the signals on lines 114 have a high value and the other half of the signals on lines 114 have a low value. Encoder 110 can generate a differential transition on lines 114 for each symbol received on lines 112. Each differential transition can have one signal on lines 114 with a high value transitioning to a low value and one signal on lines 114 with a low value transitioning to a high value, while the remaining signals of lines 114 continue at their previous value. Generally, any one of the signals on lines 114 with a high value may be selected, depending on the symbol received on lines 112, to transition to a low value and any one of the signals on lines 114 with a low value may be selected, depending on the symbol received on lines 112, to transition to a high value. The receiving of the symbol on lines 112 and the generation of the corresponding differential transition can be initiated by transitions of the transmit clock on line 116.

The multi-differential amplifier 108 amplifies the differential transitions received on lines 114 from the encoder 110 and transmits the amplification of the differential transitions to the channel on lines 102. The multi-differential amplifier 108 can be an inverting amplifier that generates the signals of the channel on lines 102 by inverting the polarity of corresponding signals received on lines 114. The multi-differential amplifier 108 can be a non-inverting amplifier and can also have multiple stages of multi-differential amplification. The amplification by the multi-differential amplifier 108 can enable transmitting a sufficient level of signal strength into a characteristic impedance of the channel on lines 102.

The receiver 106 can include a multi-differential amplifier 118 and a clock and data recovery circuit 120. In certain embodiments, the receiver 106 can include a clock recovery circuit (not shown). The multi-differential amplifier 118 amplifies the differential transitions received by the receiver 106 from the signals of the channel on lines 102. The channel on lines 102 and impedance discontinuities, such as between the transmitter 104 and the channel on lines 102 and between the channel on lines 102 and the receiver 106, can severely attenuate the differential transitions received by the multi-differential amplifier 118 of receiver 106. The multi-differential amplifier 118 can include multiple stages of multi-differential amplification to amplify the differential transitions to a sufficient level on lines 122 for processing by the clock and data recovery circuit 120.

The clock and data recovery circuit 120 can recover symbols on lines 124 from the differential transitions received on lines 122 from the multi-differential amplifier 118. These symbols on lines 124 output by the receiver 106 may correspond with the symbols provided to transmitter 104 on lines 112. The clock and data recovery circuit 120 may also recover the embedded clock in the differential transitions received from multi-differential amplifier 118 on lines 122 and output the clock on line 126. The recovered clock on line 126 from receiver 106 may correspond with the clock provided to transmitter 104 on line 116.

Figure 2:
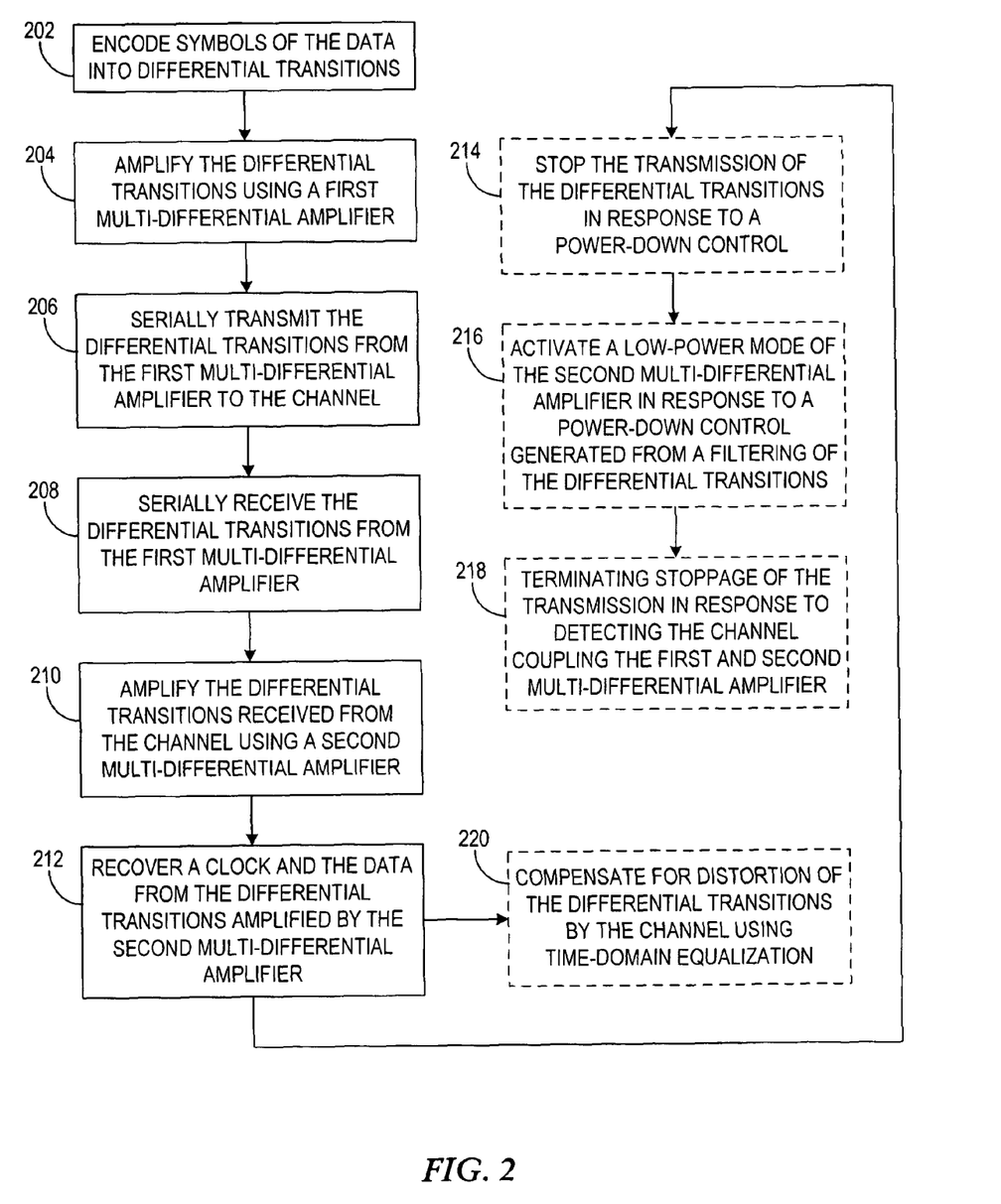
FIG. 2 is a flow diagram of a process for communicating data using a multi-differential embedded-clock channel in accordance with various embodiments of the invention.

FIG. 2 is a flow diagram of a process for communicating data using a multi-differential embedded-clock channel in accordance with various embodiments of the invention. Data is communicated through the channel by encoding the data, transmitting a representation of the data to the channel, receiving the representation of the data from the channel, and recovering the data from the representation. Symbols of the data are represented with differential transitions of signals in the channel.

At step 202, symbols of the data are encoded into differential transitions. The channel includes at least four signals, and a particular differential transition can be between any two of the four signals. However, a differential transition has one signal of the channel transitioning from a high value to a low value, and another signal of the channel transitioning from a low value to a high value, such that the two signals for a particular transition are signals with complementary values before and after the differential transition. Two signals currently having similar values cannot produce a differential transition until one of the signals changes value in a differential transition with a third signal of the channel. In general, differential transitions can be formed between all combinations of two of the signals of the channel.

The data communicated through the channel can be separated into symbols and each symbol can be encoded into a differential transition between a combination of two signals of the channel. The combination of two signals can be one of all of the combinations of two signals that corresponds with the symbol.

In one embodiment, the channel has four signals, with six combinations of two of the four signals. The values of the four signals may be represented as "0011," "0101," "0110," "1001," "1010," and "1100," when half the signals have the value of zero and the other half have the value of one. The data to be encoded can be separated into symbols of 2-bits each. One bit of the symbol may select whether the leftmost or rightmost signal that has a value of zero in the representation is included in the differential transition, and the other bit of the symbol may select whether the leftmost or rightmost signal that has a value of one in the representation is included in the differential transition for the symbol. The symbol is encoded by selection the appropriate one of the differential transitions depending upon the current values of the signals of the channel. For example, when the symbol to be encoded has a representation "01" and the current value of the signals of the channel is represented as "0011," one bit of the symbol can select the rightmost signal that has a value of zero, and the other bit of the symbol can select the leftmost signal that has a value of one, such that the value of the signals of the channel after the differential transition can be represented as "0101".

A step 204, the differential transitions are amplified using a transmit multi-differential amplifier. The differential transitions can be amplified to drive the channel at a sufficient signal level. The transmit multi-differential amplifier is capable of amplifying a differential transition between any two input signals. At step 206, the amplified differential transitions from the transmit multi-differential amplifier are serially transmitted to the channel.

At step 208, the differential transitions are serially received from the channel by a receive multi-differential amplifier. At step 210, the receive multi-differential amplifier amplifies the differential transitions received from the channel. The amplification by the receive multi-differential amplifier can offset attenuation of the differential transitions by the channel. At step 212, a clock and the data are recovered from the differential transitions amplified by the by receive multi-differential amplifier. The data recovery can decode the symbols, where were encoded at step 202, from the differential transitions.

At optional step 214, the transmitting of the differential transitions to the channel of step 206 can be stopped in response to a power-down control. An example usage of the power-down control is a low-power operating mode that is activated when data no longer needs to be communicated through the channel. Stopping the transmission of the differential transitions to the channel may be accomplished by stopping a transmit clock, and/or by turning off current sources in the transmit multi-differential amplifier. In one embodiment, the signals of the channel are clamped to a rail of the power supply during the stoppage of the transmission.

At optional step 216, the signals received from the channel may be collectively filtered using a low-pass filter. During the transmitting of the differential transitions, typically half of the signals of the channel are high and the other half of the signals of the channel are low, such that a filtered direct current component of the all signals of the channel can be a level approximately halfway between the high and low levels of the signals on the channel. In an embodiment with the signals of the channel clamped to a rail of the power supply during the stoppage of the transmission, the filtered direct current component may tend toward the rail of the power supply during the stoppage of the transmission. Another power-down control can be generated when the filtered component crosses a threshold level. This power-down control can activate a low-power operating mode of the receive multi-differential amplifier. Thus, the stoppage of transmitting differential transitions at step 214 may cause the activation of low-power operating mode of the receive multi-differential amplifier at step 216.

In one embodiment, the channel can be severed, for example, to disconnect a peripheral from a computer. Severing the channel may disconnect a respective load from the transmit and receive multi-differential amplifiers, and the disconnection can be detectable at either the transmit or receive ends of the channel. For example, severing the channel can cause a collectively filtered direct current component of the received signals of the channel to tend towards a rail of the power supply. An indication of the severance can be generated at the receive end of the channel when the filtered component crosses a corresponding threshold. Connection or reconnection of the channel may connect a respective load to the transmit and receive multi-differential amplifiers, and the connection can also be detectable at either the transmit or receive ends of the channel. At step 218, the stoppage of the transmission of step 214 may be terminated in response to detection of connection or reconnection of the channel between the first and second multi-differential amplifiers.

The differential transitions may be distorted by the channel and by reflections from discontinuities of the channel. An example channel is traces on a printed circuit board over a ground plane. The differential transitions may cause dissipation in the dielectric of the printed circuit board. This dissipation may be frequency dependent, such that the higher frequency components of the differential transitions are attenuated by the dielectric dissipation more than the lower frequency components. This frequency dependent attenuation can distort the differential transitions. Discontinuities in the channel, such as an impedance mismatch between the channel and either the transmit or receive multi-differential amplifiers, can distort the differential transitions by causing inter-symbol interference with the energy from previous differential transitions affecting later differential transitions.

At step 220, time-domain equalization may be used to compensate for the distortion of the differential transitions. For example, a respective nominal timing of transmitting each differential transition at step 206 may be adjusted to compensate for the distortion.

Figure 3:
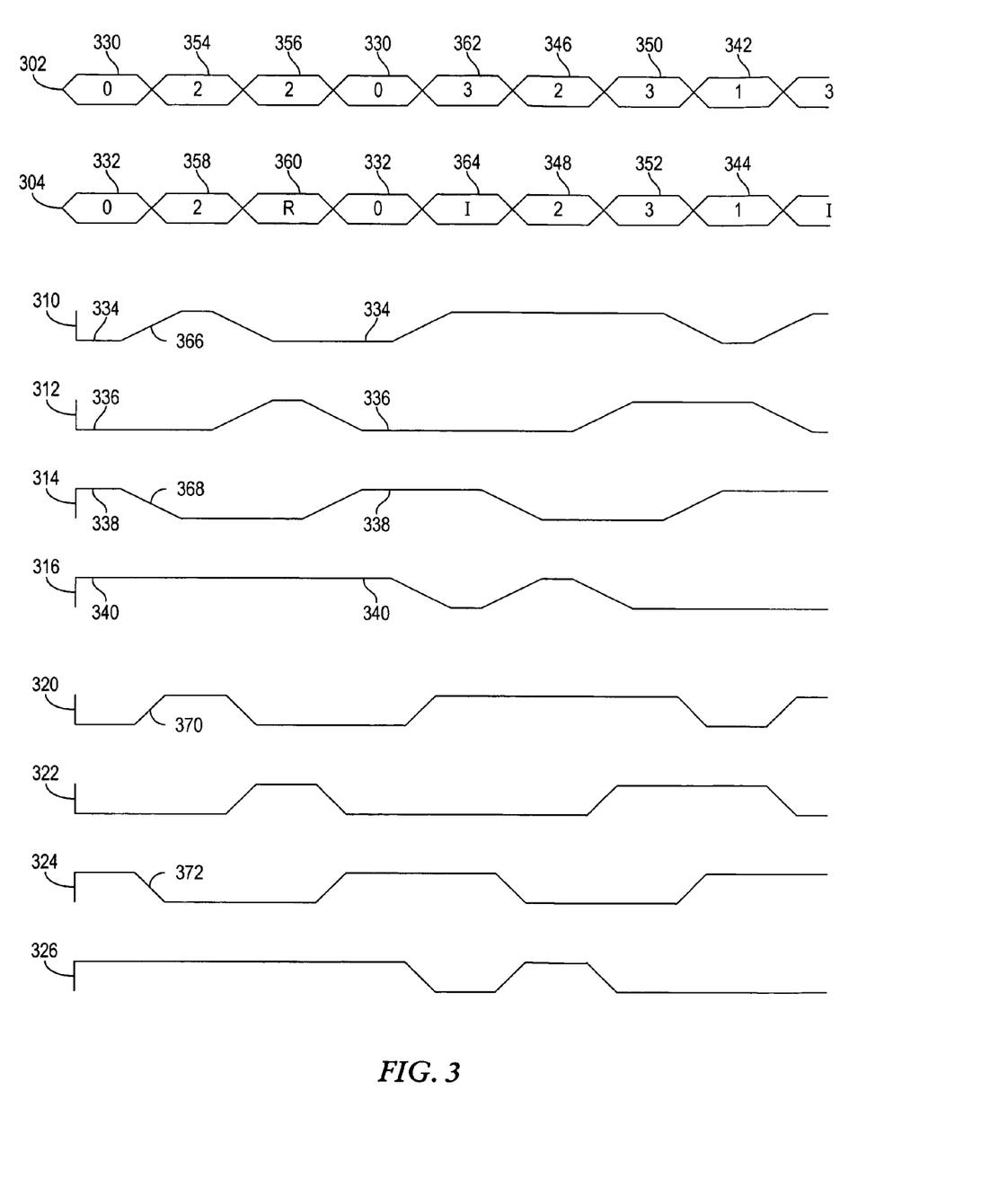
FIG. 3 is a waveform diagram of example inputs and corresponding outputs of an example multi-differential amplifier in accordance with various embodiments of the invention.

FIG. 3 is a waveform diagram of example inputs and corresponding outputs of an example multi-differential amplifier in accordance with various embodiments of the invention. Also shown in FIG. 3 is the data symbols on waveform 302 and protocol symbols on waveform 304 corresponding, in one embodiment, to the inputs and outputs of the example multi-differential amplifier. The multi-differential amplifier has four inputs, in-A on waveform 310, in-B on waveform 312, in-C on waveform 314, and in-D on waveform 316. The multi-differential amplifier has four corresponding outputs, out-A on waveform 320, out-B on waveform 322, out-C on waveform 324, and out-D on waveform 326. The example multi-differential amplifier is an inverting amplifier; out-A on waveform 320 is the inverse of in-A on waveform 310, out-B on waveform 322 is the inverse of in-B on waveform 312, out-C on waveform 324 is the inverse of in-C on waveform 314, and out-D on waveform 326 is the inverse of in-D on waveform 316.

In one embodiment, an encoder can generate the input waveforms 310, 312, 314, and 316 from the symbols of the data on waveform 302 that are communicated through the channel. In another embodiment, an encoder can generate the input waveforms 310, 312, 314, and 316 from the protocol symbols on waveform 304. Each of the data symbols of waveform 302 can represent 2-bits of the data communicated through the channel. The zero-data symbols 330 and the zero-protocol symbols 332 can be represented in the channel by "0011" with respective values for the input waveforms of a low value 334 for in-A on waveform 310, a low value 336 for in-B on waveform 312, a high value 338 for in-C on waveform 314, and a high value 340 for in-D on waveform 316. Similarly, the one-data symbol 342 and one-protocol symbol 344 can be represented by "0110," the two-data symbol 346 and two-protocol symbol 348 can be represented by "1001," and the three-data symbol 350 and three-protocol symbol 352 can be represented by "1100" in the channel.

A differential transition is generated between two successive representations in the channel of the data symbols on waveform 302 unless the two successive representations are either the same or complementary representations. For example, data symbols 354 and 356 on waveform 302 are the same, and while two-data symbol 354 on waveform 302 has corresponding two-protocol symbol 358 on waveform 304, to produce a differential transition two-data symbol 356 on waveform 302 instead has a corresponding protocol symbol 360 on waveform 304 that is a repeat-protocol symbol having a representation "0101" in the channel. Similarly, zero-data symbols 330 and three-data symbol 362 on waveform 302 have complementary representations, and to produce a differential transition on waveform 304, protocol symbol 332 is a zero-protocol symbol and protocol symbol 364 is an invert-protocol symbol having a representation "1010" in the channel.

The differential transitions between the inputs in-A on waveform 310, in-B on waveform 312, in-C on waveform 314, and in-D on waveform 316 can occur between any two of the inputs in-A, in-B, in-C, and in-D, as shown. For example, a differential transition is produced by transition 366 on input in-A on waveform 310 and by transition 368 on input in-C on waveform 314.

For each of the differential transitions between inputs in-A, in-B, in-C, and in-D on waveforms 310, 312, 314, and 316, respectively the outputs out-A, out-B, out-C, and out-D on waveforms 320, 322, 324, and 326 have a corresponding differential transition. For example the differential transition of transitions 366 and 368 on waveforms 310 and 314 respectively has corresponding differential transition 370 and 372 on waveforms 320 and 324 respectively. Each differential transition on outputs out-A, out-B, out-C, and out-D on waveforms 320, 322, 324, and 326 is an amplification of the corresponding differential transition on inputs in-A, in-B, in-C, and in-D on waveforms 310, 312, 314, and 316. The amplification can increase the edge rate of the differential transitions, increase the signal swing between the differential transitions, increase the drive power, and/or re-center the crossing level of the differential transitions within the signal swing.

The differential amplifier can be used to interface to the channel by either a transmitter or a receiver. For a transmitter, inputs in-A, in-B, in-C, and in-D on waveforms 310, 312, 314, and 316 can be coupled to the output of an encoder of the data symbols on waveform 302 or the protocol symbols on waveform 304 and the outputs out-A, out-B, out-C, and out-D on waveforms 320, 322, 324, and 326 can be coupled to the channel. For a receiver, inputs in-A, in-B, in-C, and in-D on waveforms 310, 312, 314, and 316 can be coupled to the channel and outputs out-A, out-B, out-C, and out-D on waveforms 320, 322, 324, and 326 can be coupled to a clock recovery circuit and/or a clock and data recovery circuit.

Figure 4:
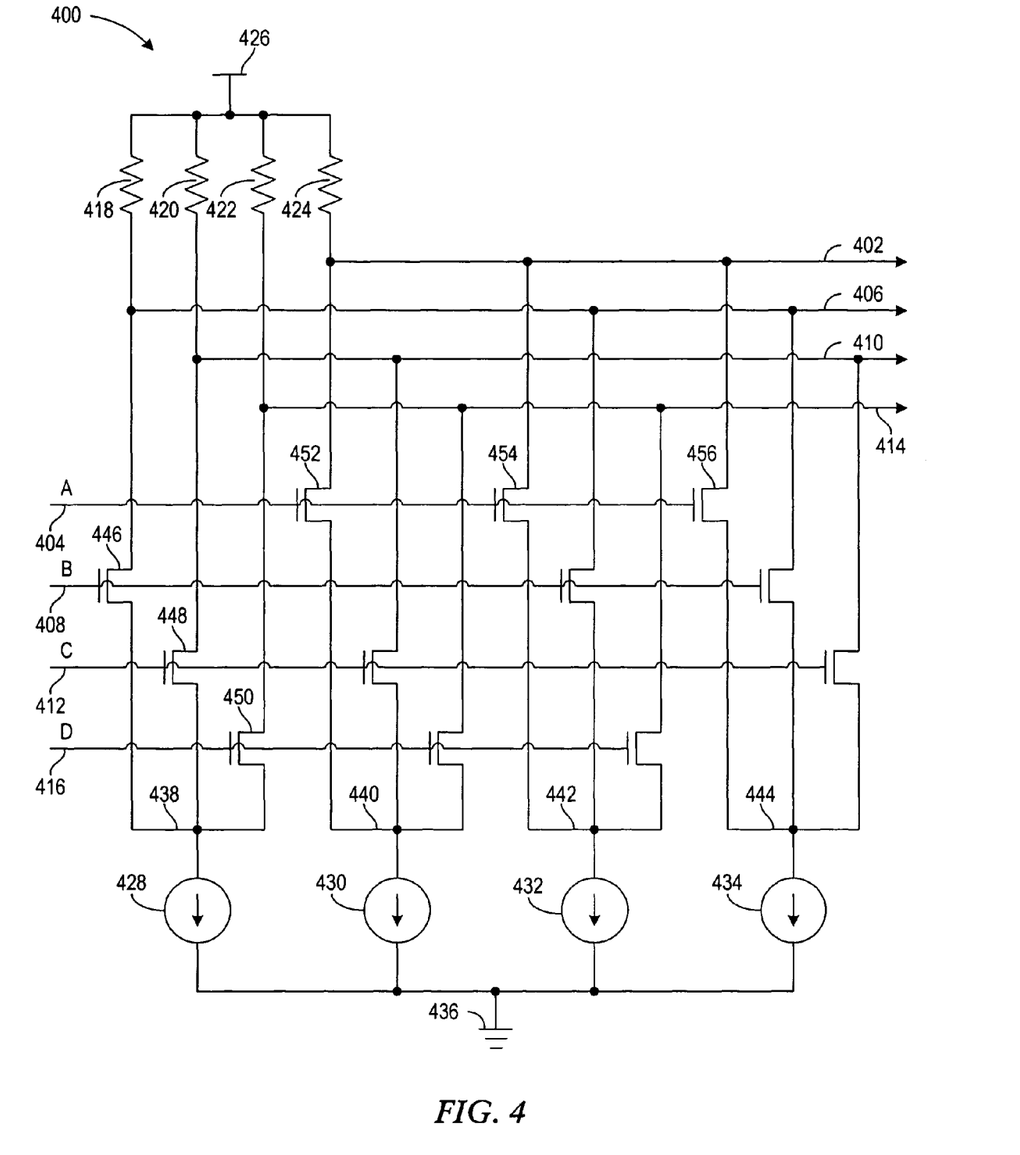
FIG. 4 is a circuit diagram of a multi-differential amplifier in accordance with various embodiments of the invention.

FIG. 4 is a circuit diagram of a multi-differential amplifier 400 in accordance with various embodiments of the invention. A multi-differential amplifier can include one or more cascaded stages, with each stage corresponding to multi-differential amplifier 400. Multi-differential amplifier 400 is an inverting amplifier, with signal out-A on line 402 being an inversion of signal in-A on line 404, signal out-B on line 406 being an inversion of signal in-B on line 408, signal out-C on line 410 being an inversion of signal in-C on line 412, and signal out-D on line 414 being an inversion of signal in-D on line 416. During a differential transition between two of the input signals in-A on line 404, in-B in line 408, in-C on line 412, and in-D on line 414, the differential transition is amplified by the multi-differential amplifier 400 and the amplified differential transition is output on output signals out-A on line 402, out-B on line 406, out-C on line 410, and out-D on line 414.

Multi-differential amplifier 400 includes four resistive circuits 418, 420, 422, and 424. Each of resistive circuits 418, 420, 422, and 424 couples a rail 426 of a power supply and respective signals out-A on line 402, out-B on line 406, out-C on line 410, and out-D on line 414. Resistive circuits 418, 420, 422, and 424 provide loads for the multi-differential amplifier 400 and each can be one or more parallel transistors operating in diode mode and/or triode mode.

Multi-differential amplifier 400 also includes four current-source circuits 428, 430, 432, and 434. Each of current-source circuits 428, 430, 432, and 434 couples another rail 436 of the power supply and respective signals on lines 438, 440, 442, and 444. Current-source circuits 428, 430, 432, and 434 can each be a current-mirror transistors controlled by a bias voltage.

Between differential transitions of the inputs on lines 404, 408, 412, and 416, two of these inputs have a low value and two of these inputs have a high value. Switching devices 446, 448, and 450, which can be transistors, form one of four similar switching circuits. The switching circuit of switching devices 446, 448, and 450 form part of a three-way differential amplifier. Because this three-way differential amplifier receives three inputs on lines 408, 412, and 416, of the four inputs to the multi-differential amplifier 400, the three-way differential amplifier has one input with a low value and two inputs with a high value, or the three-way differential amplifier has two inputs with a low value and one input with a high value. Because at least one input to the three-way differential amplifier has a low value and at least one input has a high value, proper operation in the linear range of the three-way differential amplifier is provided even though any two of the inputs on lines 404, 408, 412, and 416 may simultaneously have a low value.

For each of the four combinations of three of the four inputs on lines 404, 408, 412, and 416 (the combination having the inputs lines 408, 412, and 416; the combination having the inputs on lines 404, 412, and 416, the combination having the inputs on lines 404, 408, and 416; and the combination having the inputs on lines 404, 408, and 412) multi-differential amplifier 400 has a respective switching circuit similar to the switching circuit formed by switching devices 446, 448, and 450. The switching circuit formed by switching devices 446, 448, and 450 selectively couples the signal on line 438 to the output signals on lines 406, 410, and 414 respectively corresponding to the input signals on lines 408, 412, and 416 of the switching circuit. Switching device 446 selectively couples the signal on line 438 to the output on line 406 corresponding to the input on line 408 that controls the switching device 446. Similarly, switching device 448 selectively couples the signal on line 438 to the output on line 410 as controlled by the input on line 412, and switching device 450 selectively couples the signal on line 438 to the output on line 414 as controlled by the input on line 416.

When the input in-A on line 404 has a low value, each of switching devices 452, 454, and 456 is not conducting current because all of the corresponding switching circuits for each of these switching devices have at least one input with a high value. Thus, resistive circuit 424 pulls the output out-A on line 402 to a high value. When the input in-A on line 404 has a high value, one of switching devices 452, 454, and 456 is fully conducting current because one of the corresponding switching circuits for each of these switching devices has the other two inputs having a low value. In addition, when the input in-A on line 404 has a high value, two of switching devices 452, 454, and 456 are partially conducting current because the corresponding switching circuits for these switching devices have a low value and a high value on the other two inputs. The current through the fully or partially conducting switching devices 452, 454, and 456 produces a voltage drop across resistive circuit 424, causing output signal out-A on line 402 to be a low value. Thus, signal out-A on line 402 is an inversion of signal in-A on line 404.

Depending on the amount of current flowing through the partially conducting switching devices 452, 454, and 456 when input in-A on line 404 has a high value, the current through resistive circuit 424 can vary between the current sourced by from one to three of the current-source circuits 428, 430, 432, and 434. When the inputs on lines 404, 408, 412, and 416 are balanced, this current through resistive circuit 424 is nominally a current corresponding to two of the current-source circuits 428, 430, 432, and 434. Resistive circuit 424 can be a non-linear device, such as a transistor operating in triode mode, that provides a high amplification gain for a current through the resistive circuit 424 that is less than a current sourced by one of the current-source circuits 428 through 434 and a low amplification gain for a current through the resistive circuit 424 that is greater than the current sourced by one of the current-source circuits 428 through 434.

Multi-differential amplifier 400 can implement the resistive circuits 418 through 424, the current-source circuits 428 through 434, and the switching devices, such as switching device 446, using transistors. Each path through the multi-differential amplifier 400 between the power supply rails 426 and 436, such as the path through resistive device 418, switching device 446, and current source 428, can pass through three transistors. Having these paths through multi-differential amplifier 400 limited to three transistors improves the tolerance of the decreasing power supply voltage for each successive integrated circuit processing generation. For example, when the multi-differential amplifier 400 is used to receive differential transitions from a communication channel, the linear operating range is improved and consequently common mode noise is rejected over a wider input range.

It will be appreciated the multi-differential amplifier 400 can be readily extended to a greater number of input signals. For example, a six-input multi-differential amplifier can have three inputs with a high value and three inputs with a low value between transitions. A four-way differential amplifier receiving four of the six inputs will have at least one input with a low value and at least one input with a high value. For the fifteen combinations of four of the six inputs, a corresponding four-way differential amplifier can be formed in a manner similar to the four three-way differential amplifiers of multi-differential amplifier 400.

Figure 5:
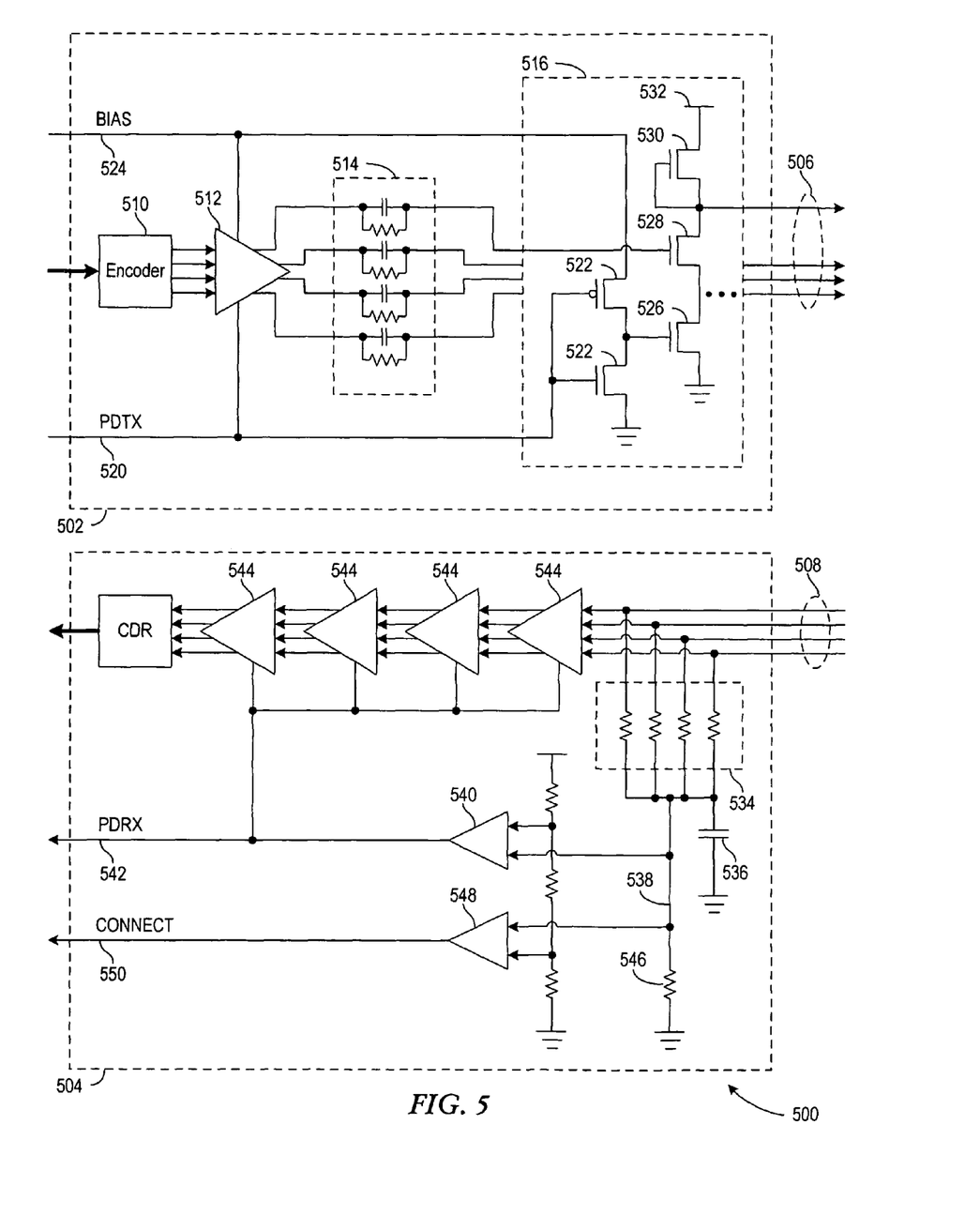
FIG. 5 is a circuit diagram of a transceiver in accordance with various embodiments of the invention.

FIG. 5 is a circuit diagram of a transceiver 500 in accordance with various embodiments of the invention. The transceiver 500 includes a transmitter 502 and a receiver 504. The transmitter 502 transmits differential transitions between any two of the outgoing signals on lines 506 of a communication channel. The receiver 504 receives differential transitions between any combination of two of the incoming signals on lines 508 of the communication channel.

An encoder 510 encodes the data to be communicated by the outgoing signals on lines 506 of the communication channel into differential transitions. A first stage 512 of multi-differential amplification amplifies the differential transitions. A compensator 514 compensates for distortion of the differential transitions by the channel and by reflections from various impedance discontinuities. The outgoing signals on lines 506 of the channel may form a low-pass filter. The compensator 514 may be a high-pass filter that compensates for the distortion of the differential transitions. An additional stage 516 of multi-differential amplification can produce a full signal swing on the outgoing signals on lines 506 of the channel, such that the net effect of the compensator 514 is to adjust a nominal timing of each of the differential transitions, thereby providing time-domain equalization. Using time-domain equalization improves tolerance to the decreasing power supply voltage of each successive process generation.

The stages 512 and 516 of multi-differential amplification can include the implementation shown in FIG. 4. Stage 516 of multi-differential amplification is shown with additional circuitry for power-down control of the stages 516 and/or 512. A power-down control input on line 520 can be used to stop the transmission of differential transitions from the transmitter 502. The power-down control on line 520 can enable or disable gating transistors 522 to deliver a bias voltage on line 524 to current source 526. When the power-down control on line 520 enables delivery of the bias voltage on line 524 to current source 526, the transmitter 502 can transmit differential transitions to outgoing signals on lines 506 of the channel. When the power-down control on line 520 disables delivery of the bias voltage on line 524 to the current source 526, the current source 526 is turned off and the transmission of differential transitions to the outgoing signals on lines 506 of the channel is stopped.

Current source 526 may correspond to current-source circuit 428 of FIG. 4, transistor 528 may correspond to switching device 446 of FIG. 4, and load transistor 530 may correspond to resistive circuit 418 of FIG. 4. Load transistor 530 may be a non-linear resistive circuit as shown. When the current source 526 is turned off in response to the power-down control on line 520, the load transistors, such as load transistor 530, can clamp the outgoing signals on lines 506 to a power supply rail 532.

Receiver 504 may receive differential transitions from incoming signals on lines 508 of the channel. Termination-resistance circuit 534 can terminate the characteristic impedance of the incoming signals on lines 508 of the channel. Because two of the incoming signals on lines 508 have a low value and the other two of the incoming signals on lines 508 have a high value between differential transitions, the average value provided by the low-pass filter of termination-resistance circuit 534 and termination-capacitance circuit 536 can be a termination voltage on line 538 that is approximately halfway between the low value and the high value.

Comparator 540 may compare the termination voltage on line 538 with a reference. The receiver 504 may be coupled by the incoming signals on lines 508 of the channel to another transmitter similar to transmitter 502. When a transmitter coupled to incoming signals on lines 508 is powered down, all of the incoming signals on line 508 may tend towards the voltage of a rail of the power supply, and the termination voltage on line 538 may consequently also tend towards the voltage of the rail of the power supply. Comparator 540 may generate a power-down control on line 542 when the termination voltage on line 538 crosses a threshold voltage. The power-down control on line 542 can activate a low-power mode of the stages 544 of multi-differential amplification. Thus, the power-down of a transmitter coupled to the incoming signals on line 508 of the receiver 504 can cause the power-down of the receiver 504.

When the connection of a transmitter to the incoming signals on lines 508 of the channel is severed, the termination-capacitance 536 can discharge through resistance 546 and comparator 548 can detect when the termination voltage on line 538 is reduced below a threshold. When a connection is initially established or a connection is reestablished, the comparator 548 can generate a connection indication on line 550. The connection indication on line 550 can be used to terminate assertion of a power-down control on line 520, such that stoppage of transmission of differential transitions by transmitter 502 to outgoing signals 506 of the channel is terminated.

Various embodiments of the present invention are described in terms of N-channel field effect transistors. Those skilled in the art will appreciate that the invention could be implemented in using P-channel field effect transistors or using bipolar transistors.

The present invention is thought to be applicable to a variety of systems for communicating data. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. An interface circuit for a multi-differential embedded-clock channel for communicating data, comprising:
    a first plurality of first signals, wherein the first plurality is at least four;
    a second plurality of second signals, wherein the second plurality is at least four; and
    a multi-differential amplifier coupled to the first and second signals, the multi-differential amplifier adapted to generate the second signals by amplifying, for all combinations of two of the first signals, differential transitions between the two of the first signals, wherein each of a plurality of symbols of the data has a corresponding one of the differential transitions, and the differential transitions are serially communicated through the channel.

2. The interface circuit of claim 1, wherein for each of the symbols, the corresponding one of the differential transitions amplified by the multi-differential amplifier has one of the two of the first signals transitioning from a first value to a second value and the other of the two of the first signals transitioning from the second value to the first value, and the first signals other than the two of the first signals continuing at a respective one of the first and second values.

3. The interface circuit of claim 1, wherein the first plurality of first signals is four first signals and the second plurality of second signals is four second signals, each of the second signals corresponding to a respective one of the first signals, the multi-differential amplifier comprising:
    four resistive circuits, each coupling a rail of a power supply and a respective one of the second signals;
    four current-source circuits, each coupling another rail of the power supply and a respective one of four third signals; and
    for each of the four combinations of three of the first signals, a respective switching circuit selectively coupling a respective one of the third signals and three of the second signals corresponding to the three of the first signals, the respective switching circuit including three switching devices, each of the three switching devices selectively coupling, as controlled by a respective one of the three of the first signals, the one of the third signals and a respective one of the three of the second signals corresponding to the respective one of the three of the first signals.

4. The interface circuit of claim 3, wherein each of the resistive circuits is a non-linear resistive circuit adapted to provide a first range of gain of the amplification for a current through the non-linear resistive circuit that is less than a current sourced by one of the current-source circuits and a second range of the gain for a current through the non-linear resistive circuit that is greater than the current sourced by one of the current-source circuits, wherein a magnitude of the gain in the first range is greater than a magnitude of the gain in the second range.

5. The interface circuit of claim 1, wherein the multi-differential amplifier includes a plurality of transistor devices for implementing resistive circuits, switching circuits, and current-source circuits, and each of a plurality of circuit paths in the multi-differential amplifier between two rails of a power supply passes through at most three of the transistor devices.

6. The interface circuit of claim 1, wherein the multi-differential amplifier is coupled to the channel by one of the plurality of the first signals and the plurality of the second signals.

7. The interface circuit of claim 1, wherein the first plurality and the second plurality are equal.

8. The interface circuit of claim 7, wherein the multi-differential amplifier includes a plurality of stages of multi-differential amplification.

9. The interface circuit of claim 1, wherein the multi-differential amplifier includes a plurality of current sources and the multi-differential amplifier is further adapted to substantially turn off the current sources responsive to a power-down control.

10. The interface circuit of claim 9, further comprising:
    a termination-capacitance circuit adapted to store a termination voltage;
    for each one of the first signals, a respective termination-resistance circuit coupling the one of the first signals to the termination voltage of the termination-capacitance circuit; and
    a threshold circuit coupled to the termination-capacitance circuit and the current sources, the threshold circuit adapted to generate the power-down control responsive to the termination voltage.

11. The interface circuit of claim 1, further comprising an encoder circuit coupled to the first signals and adapted to encode each of the symbols of the data into the corresponding one of the differential transitions provided to the multi-differential amplifier via the first signals, wherein the multi-differential amplifier transmits the amplification of the differential transitions to the channel via the second signals.

12. The interface circuit of claim 11, further comprising a compensation circuit coupled to the encoder circuit and the multi-differential amplifier, the compensation circuit adapted to compensate for distortion by at least the channel of the amplification of the differential transitions using time-domain equalization, wherein the time-domain equalization adjusts a respective nominal timing of each of the differential transitions.

13. The interface circuit of claim 1, further comprising a clock and data recovery (CDR) circuit coupled to the second signals and adapted to recover a clock and the data from the amplification of the differential transitions received from the multi-differential amplifier via the second signals, wherein the multi-differential amplifier receives the differential transitions from the channel via the first signals.

14. A method for communicating data using a multi-differential embedded-clock channel, comprising:
amplifying a plurality of differential transitions using a first multi-differential amplifier;
serially transmitting the differential transitions from the first multi-differential amplifier to the channel, wherein the differential transitions are between all combinations of two of at least four signals of the channel;
serially receiving the differential transitions from the channel to a second multi-differential amplifier; and
amplifying the differential transitions received from the channel using the second multi-differential amplifier.

15. The method of claim 14, further comprising:
encoding a plurality of symbols of the data into the differential transitions, each of the symbols encoded into one of the differential transitions for a corresponding one of the all combinations, wherein the transmission includes the one of the differential transitions between the two of the signals of the corresponding one of the all combinations; and
recovering a clock and the data from the differential transitions amplified by the second multi-differential amplifier.

16. The method of claim 14, further comprising stopping the transmission of the differential transitions from the first multi-differential amplifier to the channel in response to a power-down, control, wherein the signals of the channel are clamped to a rail of a power supply during the stoppage of the transmission.

17. The method of claim 16, further comprising:
detecting a coupling of the channel between the first multi-differential amplifier and the second multi-differential amplifier during the stoppage of the transmission; and
terminating the stoppage of the transmission in response to the detection of the coupling.

18. The method of claim 14, further comprising:
generating a filtered component from all of the signals of the channel using a low pass filter;
generating a power-down control from the filtered component; and
activating a low-power operating mode of the second multi-differential amplifier in response to the power-down control.

19. The method of claim 14, further comprising compensating for distortion by at least the channel of the differential transitions using time-domain equalization, wherein the time-domain equalization adjusts a respective nominal timing of each of the differential transitions.

20. A system for communicating data using a multi-differential embedded-clock channel, comprising:
means for amplifying a plurality of differential transitions using a first multi-differential amplifier;
means for serially transmitting the differential transitions from the first multi-differential amplifier to the channel, wherein the differential transitions are between all combinations of two of at least four signals of the channel;
means for serially receiving the differential transitions from the channel to a second multi-differential amplifier; and
means for amplifying the differential transitions received from the channel using the second multi-differential amplifier.

21. The system of claim 20, further comprising:
means for encoding a plurality of symbols of the data into the differential transitions, each of the symbols encoded into one of the differential transitions for a corresponding one of the all combinations; and
means for recovering a clock and the data from the differential transitions amplified by the second multi-differential amplifier.

22. A circuit, comprising a transceiver for a multi-differential embedded-clock channel for communicating first and second data, the transceiver including:
a first multi-differential amplifier coupled to at least four first signals of the channel and adapted to amplify, for all combinations of two of the first signals, a plurality of first differential transitions between the two of the first signals, wherein each of a plurality of first symbols of the first data has a corresponding one of the first differential transitions, and the amplification of the first differential transitions is serially transmitted to the channel via the first signals; and
a second multi-differential amplifier coupled to at least four second signals of the channel and adapted to amplify, for all combinations of two of the second signals, a plurality of second differential transitions between the two of the second signals, wherein each of a plurality of second symbols of the second data has a corresponding one of the second differential transitions, and the second differential transitions are serially received from the channel via the second signals.

23. The transceiver of claim 22, further comprising:
an encoder circuit coupled to the first multi-differential amplifier and adapted to encode each of the first symbols of the first data into the corresponding one of the first differential transitions provided to the first multi-differential amplifier; and
a data recovery circuit coupled to the second multi-differential amplifier and adapted to recover the second data from the amplification of the second differential transitions received from the second multi-differential amplifier.

24. An amplification circuit, comprising:
four input signal lines for serially receiving a first plurality of differential transitions, wherein for all combinations of two of the four input signal lines, the first differential transitions include at least one differential transition between the two input signal lines, and each of the first differential transitions is a differential transition between two of the four input signal lines;
an amplifier coupled to receive the first differential transitions from the four input signal lines, the amplifier generating a second plurality of differential transitions from the first differential transitions, the amplifier generating a respective one of the second differential transitions for each of the first differential transitions, wherein the respective second differential transition is an amplification of the first differential transition; and
four output signal lines coupled to the amplifier for serially transmitting the second differential transitions, wherein for all combinations of two of the four output signal lines, the second differential transitions include at least one differential transition between the two output signal lines, and each of the second differential transitions is a differential transition between two of the four output signal lines.

25. The amplification circuit of claim 24, wherein the four input signal lines are coupled to receive data from a multi-differential embedded-clock channel, the first differential transitions serially communicated through the multi-differential embedded-clock channel, each of a plurality of symbols of the data having a corresponding one of the first differential transitions.

26. The amplification circuit of claim 24, wherein the four output signal lines are coupled to transmit data to a multi-differential embedded-clock channel, the second differential transitions serially communicated through the multi-differential embedded-clock channel, each of a plurality of symbols of the data having a corresponding one of the second differential transitions.

27. The amplification circuit of claim 24, wherein for each first differential transition, the amplifier generates the respective second differential transition having an edge rate that is increased over an edge rate of the first differential transition.

28. The amplification circuit of claim 24, wherein for each first differential transition, the amplifier generates the respective second differential transition having a swing between the two output signal lines for the respective second differential transition that is increased over a swing between the two input signal lines for the first differential transition.

29. The amplification circuit of claim 24, wherein the amplifier is an inventing amplifier, and for each first differential transition having a first swing between the two input signal lines for the first differential transition, the inverting amplifier generates the respective second differential transition having a second swing between the two output signal lines for the respective second differential transition, and the second swing has a polarity reversed from the first swing.

* * * * *